US012590675B2

(12) United States Patent
Hammer et al.

(10) Patent No.: US 12,590,675 B2
(45) Date of Patent: Mar. 31, 2026

(54) CRYOGENIC TANK DEVICE WITH HEAT EXCHANGER

(71) Applicant: MAGNA STEYR Fahrzeugtechnik Gmbh & Co KG, Graz (AT)

(72) Inventors: Daniel Hammer, Graz (AT); Claudio Kotnig, Nestelbach (AT); Martin Stubenrauch, Wundschuh (AT)

(73) Assignee: MAGNA STEYR Fahrzeugtechnik GmbH & Co KG, Graz (AT)

( * ) Notice: Subject to any disclaimer, the term of this patent is extended or adjusted under 35 U.S.C. 154(b) by 313 days.

(21) Appl. No.: 18/480,756

(22) Filed: Oct. 4, 2023

(65) Prior Publication Data

US 2024/0110669 A1 Apr. 4, 2024

(30) Foreign Application Priority Data

Oct. 4, 2022 (EP) .................................... 22199470

(51) Int. Cl.
*F17C 3/08* (2006.01)

(52) U.S. Cl.
CPC ...... *F17C 3/085* (2013.01); *F17C 2203/0304* (2013.01); *F17C 2203/0391* (2013.01);
(Continued)

(58) Field of Classification Search
CPC ........ F17C 2201/0104; F17C 2201/035; F17C 2201/054; F17C 2201/056;
(Continued)

(56) References Cited

U.S. PATENT DOCUMENTS 4,899,546 A 2/1990 Eigenbrod
5,613,366 A * 3/1997 Schoenman .......... F17C 13/025 62/DIG. 13

(Continued)

FOREIGN PATENT DOCUMENTS

CN 111795293 A 10/2020
CN 113739065 A 12/2021

(Continued)

OTHER PUBLICATIONS

European Search Report for EP22199470.0; mailed Mar. 22, 2023; 4 pages.
CNIPA Search Report for CN 202311289580.6 dated Dec. 22, 2025.

*Primary Examiner* — Filip Zec
(74) *Attorney, Agent, or Firm* — Jordan IP Law, LLC; Todd A. Vaughn

(57) ABSTRACT

A cryogenic tank apparatus includes an inner container for holding a cryogenic medium, an outer housing surrounding the inner container, an insulation space disposed between the inner container and the outer housing, and at least one heat exchanger. The at least one heat exchanger includes at least one cold flow line through which flows the cryogenic medium held in the inner container, and at least one hot flow line in thermal contact with the at least one cold flow line and through which flows a temperature control medium in such a manner that a transfer of heat takes place between the temperature control medium and the cryogenic medium. The at least one cold flow line is arranged on an inner side of the outer housing and the at least one hot flow line is arranged on an outer side of the outer housing so that a portion of the outer housing acts as a heat transfer surface of the heat exchanger.

20 Claims, 4 Drawing Sheets

Figure 1:
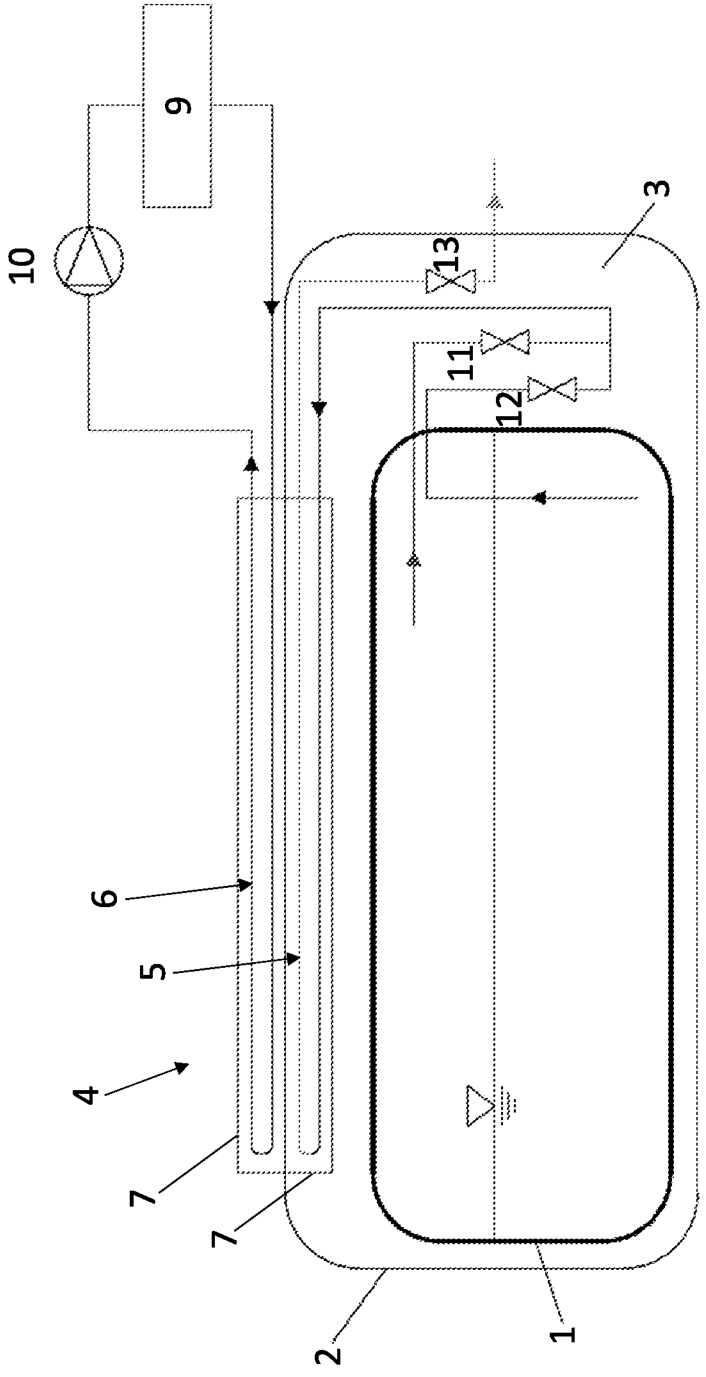

(52) U.S. Cl.
CPC ................. *F17C 2203/0629* (2013.01); *F17C 2205/0323* (2013.01); *F17C 2205/0355* (2013.01); *F17C 2221/012* (2013.01); *F17C 2223/0161* (2013.01); *F17C 2227/0323* (2013.01); *F17C 2270/0184* (2013.01)

(58) Field of Classification Search
CPC ........ F17C 2203/0304; F17C 2203/032; F17C 2203/0379; F17C 2203/0391; F17C 2203/0629; F17C 2205/0323; F17C 2205/0355; F17C 2221/012; F17C 2223/0161; F17C 2223/033; F17C 2223/043; F17C 2223/047; F17C 2225/0123; F17C 2227/0323; F17C 2227/0381; F17C 2265/066; F17C 2270/0168; F17C 2270/0184; F17C 3/08; F17C 3/085; F17C 3/10
See application file for complete search history.

(56) References Cited

U.S. PATENT DOCUMENTS

| | | | | | |
|---|---|---|---|---|---|
| 8,893,514 | B2 * | 11/2014 | Valentian | B64G 1/4021 | 62/50.3 |
| 8,960,482 | B2 * | 2/2015 | Brooks | F17C 1/12 | 220/560.15 |
| 9,010,130 | B2 * | 4/2015 | McCormick | F28F 27/00 | 62/53.2 |
| 9,261,295 | B1 * | 2/2016 | Schmidt | F17C 9/00 | |
| 9,347,560 | B2 * | 5/2016 | Lindner | F17C 1/00 | |
| 10,087,896 | B1 * | 10/2018 | Perez | F02D 41/26 | |
| 10,221,816 | B2 * | 3/2019 | Perez | B60K 6/24 | |
| 10,788,161 | B2 * | 9/2020 | Ogiwara | F17C 13/123 | |
| 12,188,461 | B2 * | 1/2025 | Benistand-Hector | F04B 53/12 | |
| 12,366,328 | B2 * | 7/2025 | Stubenrauch | F17C 3/08 | |
| 2004/0035120 | A1 * | 2/2004 | Brunnhofer | F17C 3/08 | 62/45.1 |
| 2004/0107706 | A1 | 6/2004 | Reese et al. | | |
| 2008/0251520 | A1 * | 10/2008 | Ota | F17C 1/16 | 220/586 |
| 2018/0128211 | A1 | 5/2018 | Perez | | |
| 2020/0378556 | A1 * | 12/2020 | Wowk | F17C 1/12 | |
| 2021/0372570 | A1 * | 12/2021 | Stubenrauch | F17C 3/00 | |

FOREIGN PATENT DOCUMENTS

| | | | |
|---|---|---|---|
| EP | 3021032 | A | 5/2016 |
| KR | 20070074486 | A | 7/2007 |

* cited by examiner

CRYOGENIC TANK DEVICE WITH HEAT EXCHANGER

CROSS-REFERENCE TO RELATED APPLICATIONS

The present application claims priority 35 U.S.C. § 119 to European Patent Publication No. EP 22199470.0 (filed on Oct. 4, 2022), which is hereby incorporated by reference in its entirety.

TECHNICAL FIELD

One or more embodiments relate to a cryogenic tank apparatus comprising an inner container for holding a cryogenic medium such as hydrogen.

BACKGROUND

Cryogenic tank apparatuses which comprise an inner container for holding hydrogen are known and are used in particular as mobile cryogenic tank systems, for example, in motor vehicles. Such a cryogenic tank conventionally comprises an inner container and an outer housing. Disposed between the inner container and the outer housing is an insulating space or vacuum space in which a vacuum can exist or an inert gas, for example, can be located in order to achieve good thermal insulation.

The medium in such a cryogenic tank apparatus can be heated by a heat exchanger, for example, in order to bring the cryogenic medium extracted from the cryogenic tank to a permissible temperature for a consumer, such as a fuel cell or an engine.

Such heat exchangers can be arranged, for example, in the insulation space or also outside the outer housing. It is a disadvantage that such a heat exchanger requires a relatively large installation space, and the installation space available for the other components of the cryogenic tank apparatus is therefore reduced. In particular, the usable volume for the cryogenic medium in the tank is thus also made smaller.

SUMMARY

One or more embodiments are provided to enhance a cryogenic tank apparatus of the afore-mentioned type in this respect and in particular to provide a cryogenic tank apparatus which allows the extracted medium to be heated and at the same time permits a large storage volume for the cryogenic medium.

In accordance with one or more embodiments, a cryogenic tank apparatus comprises an inner container for holding a cryogenic medium such as hydrogen, an outer housing surrounding the inner container, an insulation space disposed between the inner container and the outer housing, and at least one heat exchanger comprising: (i) at least one cold flow line through which flows the cryogenic medium held in the inner container, (ii) at least one hot flow line in thermal contact with the at least one cold flow line and through which flows a temperature control medium. Alternatively or additionally, the at least one cold flow line and the at least one hot flow line are arranged adjacent to one another along a heat transfer surface in such a manner that a transfer of heat takes place between the temperature control medium and the cryogenic medium by way of the heat transfer surface. The at least one cold flow line is arranged on an inner side of the outer housing and the at least one hot flow line is arranged on an outer side of the outer housing so that a portion of the outer housing acts as the heat transfer surface of the heat exchanger.

In accordance with one or more embodiments, the heat exchanger is integrated into the outer housing of a cryogenic tank. The outer housing of the cryogenic tank is itself used as the heat transfer surface of the heat exchanger. The cryogenic medium flows, through the at least one cold flow line, inside the outer housing, while the adjacent temperature control medium, i.e., the heat transfer medium, flows on the outer side of the outer housing through the at least one hot flow line. The at least one cold flow line and the at least one hot flow line therefore collectively form the heat exchanger with the outer housing.

In accordance with one or more embodiments, it is not the entire outer housing that acts as the heat transfer surface but substantially only a portion of the outer housing that is located in a region in which the at least one hot flow line and the at least one cold flow line are arranged. The outer housing is thus preferably covered only partially with the heat exchanger. This does not exclude, however, the possibility that the heat exchanger extends over a large portion or the entire lateral surface of the outer tank.

By using the outer housing of the cryogenic tank as the heat transfer surface of a heat exchanger, a particularly compact, integrated construction and a reduction in the required installation space are made possible.

Moreover, the cryogenic medium remains in the interior of the outer housing, while the temperature control medium remains outside the outer housing. The risk of the vacuum space or insulation space becoming contaminated with the heat transfer medium, that is to say with the temperature control medium, is thus reduced.

In accordance with one or more embodiments, there can preferably be a vacuum and/or an inert gas and/or a multi-layer insulation (MLI) in the insulation space.

In accordance with one or more embodiments, the outer housing preferably forms at least one sector in the peripheral direction of the at least one cold flow line and/or of the at least hot cold flow line. The outer housing is therefore not only used as the heat transfer surface of the heat exchanger but at the same time forms the at least one cold flow line and/or the at least hot cold flow line in part, namely in sectors, that is to say in parts of the periphery thereof, thus the required channels of the heat exchanger. Alternatively, the at least one cold flow line and/or the at least hot cold flow line can be formed as a separate complete line which is additionally arranged, internally and/or externally, on the outer housing.

In accordance with one or more embodiments, the at least one cold flow line and/or the at least hot cold flow line is preferably formed at least in part by the outer housing and by a housing which surrounds the outer housing in some regions. The housing can be formed on the inner side and/or on the outer side of the outer housing and, together with the outer housing, forms the at least one cold flow line and/or the at least hot cold flow line.

In accordance with one or more embodiments, the outer housing, in a region in which it acts as the heat transfer surface of the heat exchanger, preferably has fins on its inner side and/or on its outer side. Via the fins, the thermal transfer or heat transfer can be enhanced. The fins can also serve to form channels of the at least one cold flow line and/or of the at least hot cold flow line.

Alternatively or additionally, channels and lines of the at least one cold flow line and/or of the at least hot cold flow line can be formed by the housing surrounding the outer housing in some regions, which serves to form the at least one cold flow line and/or the at least hot cold flow line on the side remote from the outer housing. The housing can have fins for forming the channels.

In accordance with one or more embodiments, the inner container and the outer housing of the cryogenic tank apparatus preferably have a cylindrical form.

In accordance with one or more embodiments, the at least one cold flow line and the at least hot cold flow line preferably run in a longitudinal direction of the outer housing. The heat exchanger is thus arranged axially, running in the longitudinal direction, on the lateral surface of the cryogenic tank. The heat exchanger, thus the at least one cold flow line and the at least hot cold flow line, can preferably have a U-shape.

In another embodiment, the at least one cold flow line and the at least hot cold flow line, and thus, the heat exchanger, run along the periphery of the outer housing, that is to say preferably along the periphery of the lateral surface of a cylindrical cryogenic tank.

In another embodiment, the at least one cold flow line and the at least hot cold flow line, and thus, the heat exchanger, are arranged on an end face of the outer housing, that is to say are arranged at the end face. The heat exchanger, i.e., the at least one cold flow line and the at least hot cold flow line, particularly preferably has substantially a circular shape which runs around the end face.

In accordance with one or more embodiments, the heat exchanger, thus the at least one cold flow line and the at least hot cold flow line, preferably has a rod shape, U-shape, circular shape, or circular segment shape.

In accordance with one or more embodiments, the at least hot cold flow line and/or the at least one cold flow line preferably comprises a plurality of channels and/or lines running in parallel and/or in series. The heat exchanger, in particular, the at least hot cold flow line and/or the at least one cold flow line, can be configured for co-current or counter-current operation.

In accordance with one or more embodiments, the at least hot cold flow line is preferably wider at least in a portion than the at least one cold flow line in an opposite portion. A wider form of the heat transfer medium side prevents the formation of cold spots on the outer side of the vacuum shell, i.e., of the outer housing, in order to avoid injury risks and ice formation or even oxygen condensation.

In accordance with one or more embodiments, a thermal insulation is preferably fitted on the side of the at least hot cold flow line that is remote from the outer housing, that is to say outside the outer housing. An additional thermal insulation of the hot side of the heat exchanger reduces heat losses to the environment.

In accordance with one or more embodiments, the cryogenic tank apparatus preferably comprises at least one additional heat exchanger for transferring heat to the cryogenic medium, the at least one additional heat exchanger being disposed in series or in parallel with the heat exchanger described above.

In accordance with one or more embodiments, the at least one additional heat exchanger is preferably also configured with features of the heat exchanger as described above, and thus, has at least one cold flow line which is arranged on the inner side of the outer housing, and at least hot cold flow line which is arranged on the outer side of the outer housing, so that the outer housing acts as the heat transfer surface of the further heat exchanger.

DRAWINGS

One or more embodiments will be illustrated by way of example in the drawings and explained in the description hereinbelow.

FIG. 1 illustrates a schematic representation of a cryogenic tank apparatus, in accordance with a first embodiment.

Figures 2A, 2B, 2C, 2D:
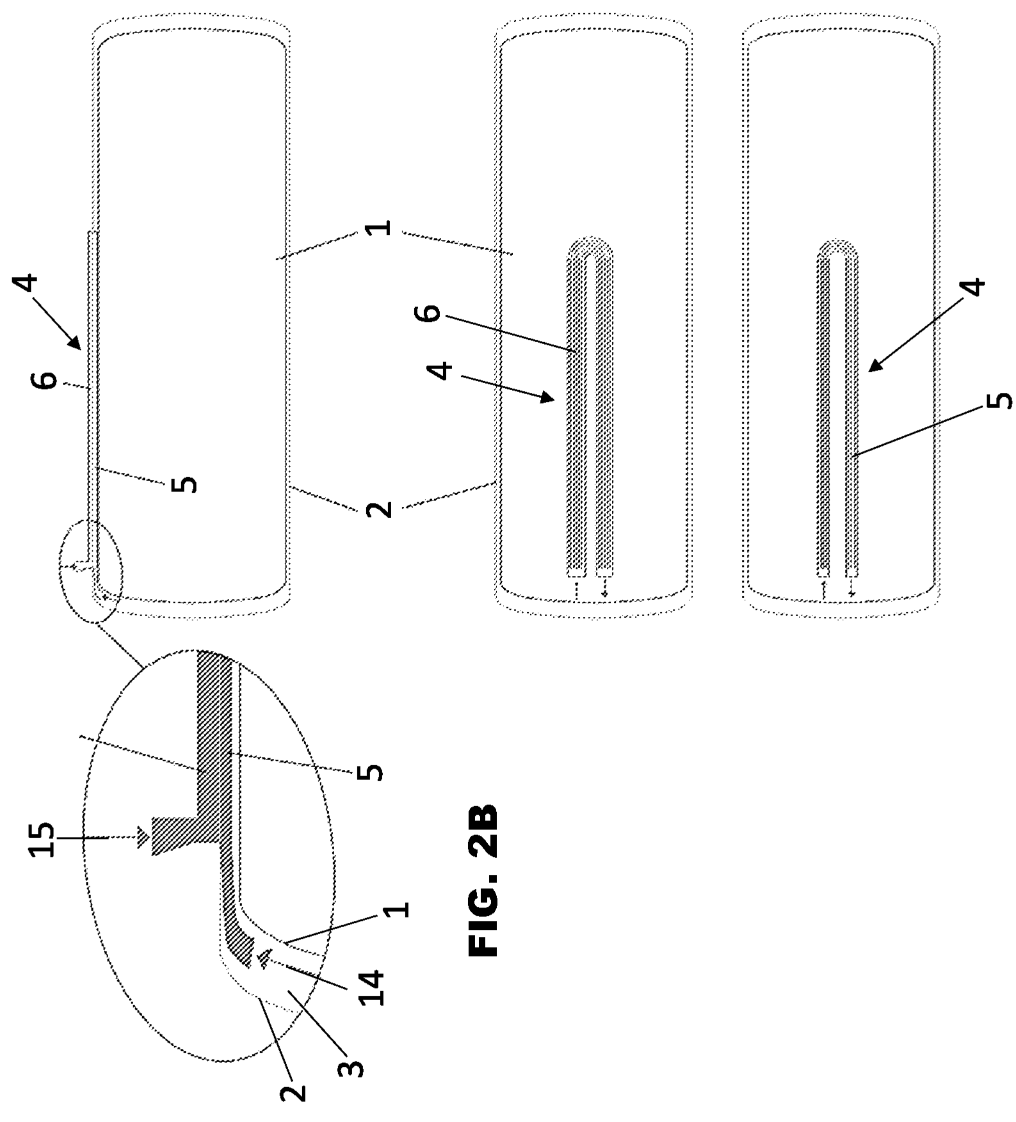

FIGS. 2A to 2D respectively illustrate a schematic representation of the cryogenic tank apparatus of FIG. 1, including a side view (FIG. 2A), a detail thereof (FIG. 2B), a top view on an outer side of the outer housing (FIG. 2C), and a top view on an inner side of the outer housing (FIG. 2D).

Figures 3A, 3B, 3C:
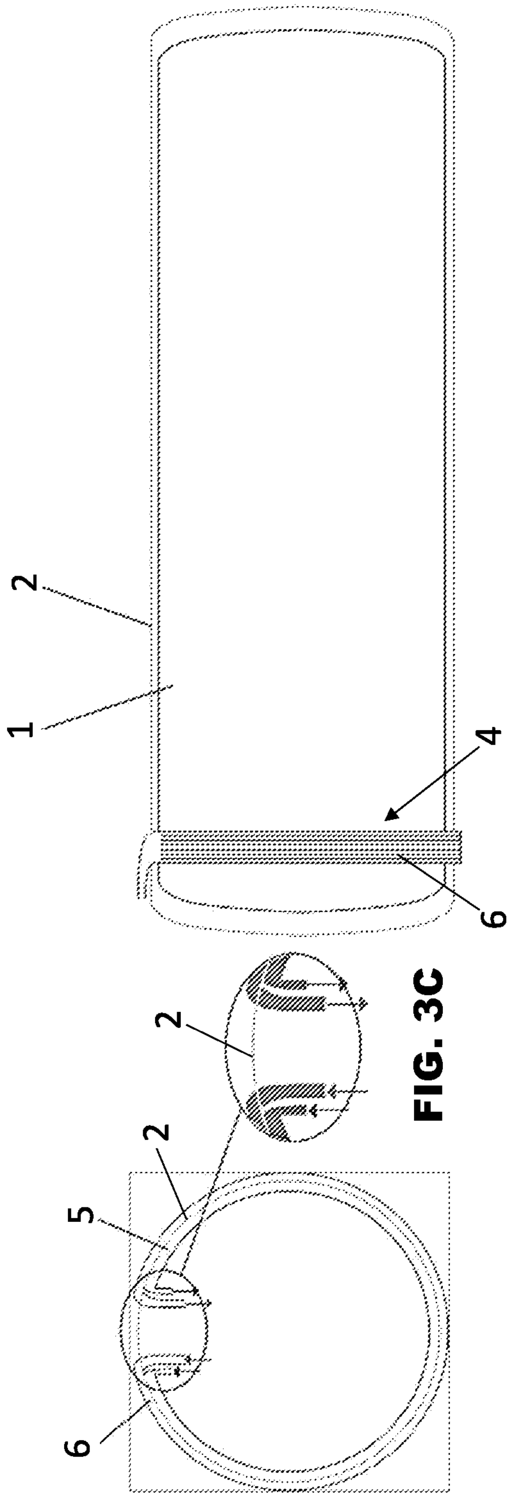

FIGS. 3A to 3C respectively illustrate a schematic representation of a cryogenic tank apparatus in accordance with a second embodiment, including a side view (FIG. 3A), an end face (FIG. 3B), and a detail thereof (FIG. 3C).

Figure 4A:
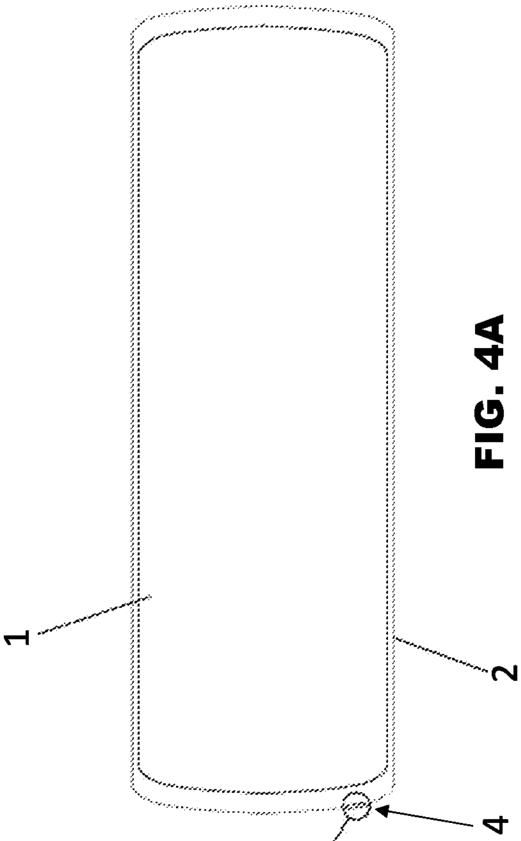
Figure 4B:
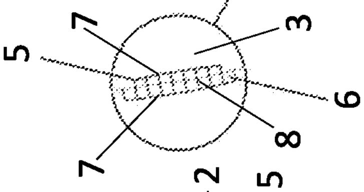
Figure 4C:
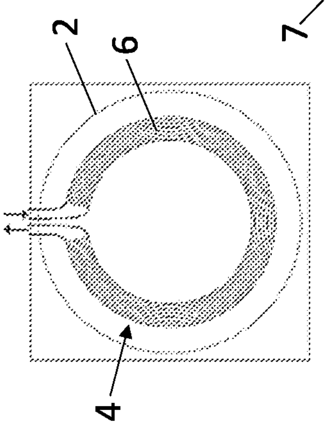
Figure 4D:
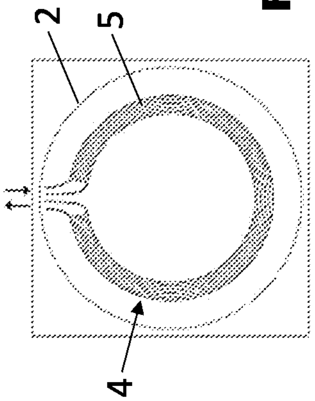

FIGS. 4A to 4D respectively illustrate a schematic representation of a cryogenic tank apparatus in accordance with a third embodiment, including a side view (FIG. 4A), a detail thereof (FIG. 4B), from an end face on an outer side of the outer housing (FIG. 4C), and from an end face on an inner side of the outer housing (FIG. 4D).

DESCRIPTION

FIG. 1 illustrates a cryogenic tank apparatus in accordance with a first embodiment. The cryogenic tank apparatus comprises an inner container 1 for holding a cryogenic medium such as hydrogen, and an outer housing 2 surrounding the inner container 1. An insulation space 3, in particular, a vacuum space, is disposed between the inner container 1 and the outer housing 2.

The cryogenic tank apparatus further comprises at least one heat exchanger 4 that itself comprises at least one cold flow line 5 through which flows the cryogenic medium that is held in the inner container 1, and at least hot cold flow line 6 through which flows a temperature control medium. The at least hot cold flow line 6 is heated by heat from a heat source 9, for example, in the form of waste heat of another component. Circulation of the temperature control medium through the at least hot cold flow line 6 can be maintained by a heat transfer pump 10.

The cryogenic medium for the at least one cold flow line 5 is extracted from the inner container 1, for example, in gas form via a gas extraction valve 11 and/or in liquid form via a liquid extraction valve 12. Downstream of the heat exchanger 4, the cryogenic medium can flow via a hydrogen extraction valve 13 to a consumer, for example, a fuel cell.

The at least one cold flow line 5 and the at least hot cold flow line 6 of the heat exchanger 4 are in contact with one another and/or are arranged adjacent to one another along a heat transfer surface in such a manner that a transfer of heat takes place between the temperature control medium in the at least hot cold flow line 6 and the cryogenic medium in the at least one cold flow line 5 via the heat transfer surface. The at least one cold flow line 5 is arranged on the inner side of the outer housing 2 and the at least hot cold flow line 6 is arranged on the outer side of the outer housing 2, so that the corresponding regions of the outer housing 2 itself act as the heat transfer surface of the heat exchanger 4.

The heat exchanger 4, or the at least one cold flow line 5 and the at least hot cold flow line 6, can be arranged at different positions on the outer housing 2. For example, FIGS. 1 and 2A to 2D illustrate an embodiment of a cryogenic tank apparatus in which the at least one cold flow line 5 and the at least hot cold flow line 6 extend in a longitudinal direction of the cylindrical outer housing 2. The heat exchanger 4, or the at least one cold flow line 5 and the at least hot cold flow line 6, here extend in a U-shape along the longitudinal axis of the cylindrical outer housing 2.

FIGS. 3A to 3C illustrate an embodiment of a cryogenic tank apparatus in which the heat exchanger 4, or the at least one cold flow line 5 and the at least hot cold flow line 6, extend along the periphery of the cylindrical outer housing 2.

FIGS. 4A to 4D illustrate another embodiment of a cryogenic tank apparatus in which the heat exchanger 4, or the at least one cold flow line 5 and the at least hot cold flow line 6, are formed on an end face of the outer housing 2, namely in the form of a circle or, more precisely, of a circular segment which approximately forms a circle.

As illustrated in the detail view of FIG. 2B, an inlet 14 to the at least one cold flow line 5 is formed in the insulation space 3 and an inlet 15 to the at least hot cold flow line 6 is formed outside the outer housing 2.

FIG. 2C illustrates the cryogenic tank apparatus from above on the outer side of the outer housing, while FIG. 2D illustrates a top view on the inner side of the outer housing. The at least one cold flow line 5 and the at least hot cold flow line 6 are in each case arranged opposite one another along their run on the outer housing 2.

FIGS. 3A to 3C illustrate, via arrows, the inflows and outflows of the at least one cold flow line 5 and the at least hot cold flow line 6 in the illustrated embodiment.

The detail view of FIG. 4B illustrates a heat exchanger 4 in lateral section. The outer housing 2 forms a sector in the peripheral direction of the at least one cold flow line 5 and of the at least hot cold flow line 6. The at least one cold flow line 5 and the at least hot cold flow line 6 are formed at least in part by the outer housing 2 and by a housing 7 which surrounds the outer housing in some regions. In a region in which the outer housing 2 acts as the heat exchange surface of the heat exchanger 4, the outer housing has fins 8 on its inner side and on its outer side. The at least hot cold flow line 6 and the at least one cold flow line 5 comprise a plurality of channels which extend in parallel, and which are separated by fins 8.

The at least hot cold flow line 6, at least in the portion illustrated in FIG. 4B, is wider than the opposite at least one cold flow line 5 in the same portion.

A thermal insulation can additionally be fitted on the side of the at least hot cold flow line 6 that is remote from the outer housing 2, which thermal insulation can comprise, for example, a further housing surrounding the at least hot cold flow line 6.

In accordance with one or more embodiments, a portion of the vacuum shell, i.e., the outer housing 2 a cryogenic tank, is used as a heat transfer surface between the cryogenic fluid and the heat transfer medium. In that way, the heat exchanger is integrated in the outer housing 2.

In order to increase the amount of heat that is transferred, the surface of the outer housing 2 that is used for the heat transfer can be provided (on both sides or only on the heat transfer medium side) with fins 8, and a corresponding enclosure can be installed thereover. The heat exchanger can be integrated into the outer housing 2 axially on the casing (FIGS. 2A to 2D), in the peripheral direction (FIGS. 3A to 3C) or at the end face (FIGS. 4A to 4D). The heat exchanger can be operated by the co-current or counter-current principle. A wider form of the heat transfer medium side prevents the formation of cold spots on the outer side of the vacuum shell, in order to avoid injury risks and ice formation or even oxygen condensation. An additional thermal insulation of the at least hot cold flow line 6, in particular of the "EGW side", where EGW stands for an ethylene glycol-water mixture as a possible temperature control medium, reduces heat losses to the environment.

The terms "coupled," "attached," or "connected" may be used herein to refer to any type of relationship, direct or indirect, between the components in question, and may apply to electrical, mechanical, fluid, thermal, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

- 1 inner container
- 2 outer housing
- 3 insulation space
- 4 heat exchanger
- 5 at least one cold flow line
- 6 at least hot cold flow line
- 7 housing
- 8 fins
- 9 heat source
- 10 heat transfer pump
- 11 gas extraction valve
- 12 liquid extraction valve
- 13 hydrogen extraction valve
- 14 inlet to cold flow line
- 15 inlet to hot flow line

What is claimed is:

1. A cryogenic tank apparatus, comprising:

an inner container for holding a cryogenic medium;

an outer housing surrounding the inner container;

an insulation space disposed between the inner container and the outer housing; and at least one heat exchanger including:

at least one cold flow line through which flows the cryogenic medium held in the inner container, and at least one hot flow line in thermal contact with the at least one cold flow line and through which flows a temperature control medium in such a manner that a transfer of heat takes place between the temperature control medium and the cryogenic medium, wherein the at least one cold flow line is arranged on an inner side of the outer housing and the at least one hot flow line is arranged on an outer side of the outer housing so that a portion of the outer housing acts as a heat transfer surface of the at least one heat exchanger.

2. The cryogenic tank apparatus of claim 1, wherein the outer housing forms at least one sector in a peripheral direction of the at least one cold flow line.

3. The cryogenic tank apparatus of claim 2, wherein the outer housing forms at least one sector in a peripheral direction of the at least hot flow line.

4. The cryogenic tank apparatus of claim 1, wherein the at least one cold flow line is formed at least in part by the outer housing and by a housing which partially surrounds the outer housing.

5. The cryogenic tank apparatus of claim 1, wherein the at least one hot flow line is formed at least in part by the outer housing and by a housing which partially surrounds the outer housing.

6. The cryogenic tank apparatus of claim 1, further comprising a plurality of fins arranged on an inner side of the outer housing in a region that serves as the heat transfer surface of the at least one heat exchanger.

7. The cryogenic tank apparatus of claim 1, further comprising a plurality of fins arranged on an outer side of the outer housing in a region that serves as the heat transfer surface of the at least one heat exchanger.

8. The cryogenic tank apparatus of claim 1, wherein the at least one cold flow line and the at least hot flow line extend in a longitudinal direction of the outer housing.

9. The cryogenic tank apparatus of claim 1, wherein the at least one cold flow line and the at least hot flow line extend along a periphery of the outer housing.

10. The cryogenic tank apparatus of claim 1, wherein the at least one cold flow line and the at least hot flow line are formed on an end face of the outer housing.

11. The cryogenic tank apparatus of claim 1, wherein the at least hot flow line comprises a plurality of channels extending in parallel and/or in series.

12. The cryogenic tank apparatus of claim 1, wherein the at least cold flow line comprises a plurality of channels extending in parallel.

13. The cryogenic tank apparatus of claim 1, wherein the at least hot flow line comprises a plurality of channels extending in series.

14. The cryogenic tank apparatus of claim 1, wherein the at least cold flow line comprises a plurality of channels extending in series.

15. The cryogenic tank apparatus of claim 1, wherein the at least hot flow line and the at least one cold flow line are configured for co-current or counter-current operation.

16. The cryogenic tank apparatus of claim 1, wherein the at least hot flow line, at least in a portion thereof, has a width that is greater wider than a width of the at least one cold flow line in an opposite portion thereof.

17. The cryogenic tank apparatus of claim 1, further comprising a thermal insulation arranged on a side of the at least hot flow line that is remote from the outer housing.

18. The cryogenic tank apparatus of claim 1, further comprising a second heat exchanger arranged in series with the heat exchanger for transferring heat to the cryogenic medium.

19. The cryogenic tank apparatus of claim 18, further comprising a second heat exchanger arranged in parallel with the heat exchanger for transferring heat to the cryogenic medium.

20. A cryogenic tank apparatus, comprising:
- an inner container for holding a cryogenic medium;
- an outer housing surrounding the inner container;
- an insulation space disposed between the inner container and the outer housing; and
- at least one heat exchanger including:
  - at least one cold flow line through which flows the cryogenic medium held in the inner container, and
  - at least one hot flow line through which flows a temperature control medium, the at least one hot flow line being arranged adjacent to the at least one cold flow line along a heat transfer surface in such a manner that a transfer of heat takes place between the temperature control medium and the cryogenic medium via the heat transfer surface,
  - wherein the at least one cold flow line is arranged on an inner side of the outer housing and the at least one hot flow line is arranged on an outer side of the outer housing so that a portion of the outer housing acts as a heat transfer surface of the heat exchanger.

* * * * *